United States Patent [19]

Brescia

[11] Patent Number: 4,528,579

[45] Date of Patent: Jul. 9, 1985

[54] INK-JET PRINTER DAMPING

[75] Inventor: Riccardo Brescia, Ivrea, Italy

[73] Assignee: Ing. C. Olivetti & C., S.p.A., Turin, Italy

[21] Appl. No.: 558,339

[22] Filed: Dec. 5, 1983

[30] Foreign Application Priority Data

Dec. 3, 1982 [IT] Italy .............................. 68423 A/82

[51] Int. Cl.$^3$ ........................ G01D 15/18; H01S 4/00

[52] U.S. Cl. ................................ 346/140 R; 346/75; 29/592 R

[58] Field of Search ...................... 346/140 R, 1.1, 75; 29/592 R

[56] References Cited

U.S. PATENT DOCUMENTS 3,683,212 8/1972 Zoltan .................................. 310/8.3
3,832,579 8/1974 Arndt ..................................... 310/8.1
4,354,197 10/1982 Reitberger ...................... 346/140 R
4,417,259 11/1983 Maeda ............................ 346/140 R

*Primary Examiner*—E. A. Goldberg
*Assistant Examiner*—Gerald E. Preston
*Attorney, Agent, or Firm*—Banner, Birch, McKie & Beckett

[57] ABSTRACT

An ink-jet printer includes a reservoir filled with ink and an ink duct communicating with the reservoir. The duct has a terminal portion with a capillary nozzle for projecting the ink, and an intermediate portion between the reservoir and the terminal portion. Transducer means are associated with the terminal portion of the duct for generating a first pressure wave in the ink, which is directed towards the nozzle and causes a droplet of ink to be discharged through the nozzle. Energy absorption means cooperate with the ink in the intermediate portion of the duct and comprise an elongate container adjacent at least part of the intermediate portion of the duct and having at least one wall which is in contact with the ink and can deform resiliently under the action of a second pressure wave associated with the first pressure wave and directed towards the intermediate portion of the duct. This container has a filling of viscous fluid whereby the energy of the second pressure wave is substantially dissipated within the viscous fluid.

6 Claims, 2 Drawing Figures

INK-JET PRINTER DAMPING

DESCRIPTION

Figure 1:
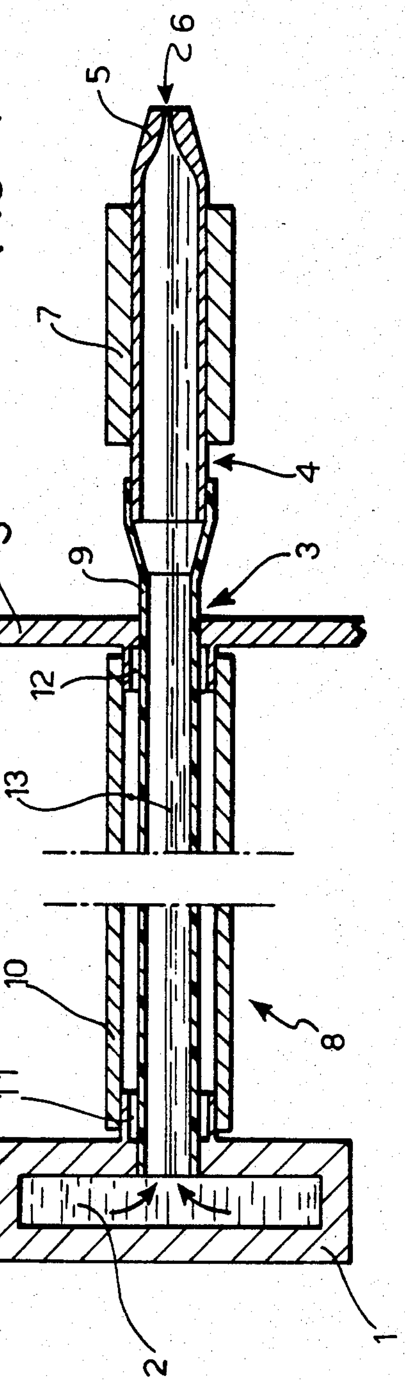

The present invention relates to ink-jet printers and is particularly concerned with a printer comprising:

a reservoir filled with ink, a duct communicating with the reservoir and filled with ink, the duct having a terminal portion provided with a nozzle for projecting the ink and an intermediate portion between the reservoir and the terminal portion, transducer means associated with the terminal portion of the duct for generating a first pressure wave in the ink, which is directed towards the nozzle and causes a droplet of ink to be discharged through the nozzle, a second pressure wave associated with the first pressure wave being directed towards the intermediate portion of the duct, and energy absorption means cooperating with the ink in the intermediate portion for substantially absorbing the energy of the second pressure wave.

The damping of the second pressure wave is essential for ensuring the correct operation of the printer. This pressure wave, which is propagated from the terminal portion of the duct towards the ink reservoir and will thus be referred to in the present description by the term reverse wave, is subject to reflection phenomena caused by discontinuities in the acoustic impedance normally present in the ink duct in the region between the terminal portion and the intermediate portion of the duct and particularly in the region between this duct and the reservoir. As a result of these reflections, the wave is propagated back towards the terminal portion of the duct where it interferes with the discharge of the ink droplets through the nozzle.

Printers of the type defined above are known in the art, in which the energy absorption means are constituted by a tube interposed between the reservoir and the terminal portion of the duct. The tube is made of a viscoelastic material which can dissipate the energy of the pressure wave propagated within the tube itself. The dimensions of the tube (length, internal diameter, wall thickness) and the elastic modulus of the viscoelastic material are chosen so that the tube has an acoustic impedance matching the acoustic impedance of the terminal portion of the duct.

This solution has several disadvantages.

In the first place, since the damping of the second pressure wave propagated within the ink duct is achieved by the viscous behaviour of the viscoelastic material of the tube, it is necessary to use a very long tube (even of the order of a meter or more) in order to achieve good damping at low frequencies. A further disadvantage is caused by the fact that the viscoelastic characteristics of the material of the tube, and hence the absorption characteristics of the tube, vary quite considerably with temperature.

The problem behind the invention is that of providing a printer of the type specified above which does not have the disadvantages indicated above and has small dimensions.

In order to solve this problem, the present invention provides a printer of the type specified above, characterised in that the energy absorption means comprise:

an elongate container adjacent at least part of the intermediate portion of the duct and having at least one wall which is in contact with the ink and can deform resiliently under the action of the second pressure wave, and a filling of viscous fluid in the container.

By virture of this characteristic, a printer is provided in which it is possible to achieve substantial absorption of the second pressure wave even with a very small bulk, and in which the absorption characteristics with respect to the wave are stable with variations in temperature.

Preferably, the device according to the invention, in which the terminal portion of the duct has a predetermined acoustic impedance, is further characterised in that the wall of the container which is resiliently deformable under the action of the second pressure wave has a resilience such that the intermediate portion of the duct has an acoustic impedance adapted to the acoustic impedance characteristic of the terminal portion of the duct.

In the device according to the invention, the adaptation of the acoustic impedance of the intermediate portion of the duct to the acoustic impedance of the terminal portion of the duct is achieved, therefore, by the choice of the material and dimensions of the resiliently deformable wall of the container, while the function of damping the "reverse" pressure wave is fulfilled essentially by the viscous liquid.

Figure 2:
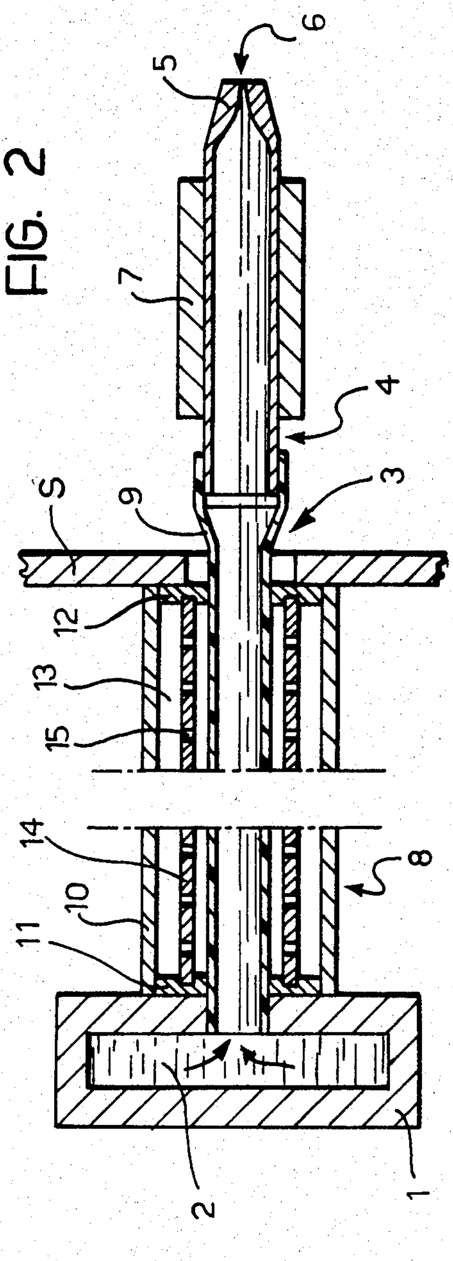

The invention will now be described, purely by way of non-limiting example, with reference to the appended drawings, in which:

FIG. 1 is an axial sectional view of a printer according to the invention, and FIG. 2 is an axial sectional view illustrating a variant of the printer of FIG. 1.

In the drawings, a reservoir is indicated 1 and is filled with ink 2. The term "ink" is to be interpreted in the present description and in the following claims as referring to any liquid which can be used for a printing or writing process.

A duct, generally indicated 3, communicates at one end with the reservoir 1 and is thus full of ink 2.

At its end opposite the reservoir 1, the duct 3 has a terminal portion 4 with an approximately constant cross-section over its entire length, which ends in a nozzle 5 having a capillary orifice 6 through which the ink in the terminal portion 4 of the duct 3 may be discharged from the printer in the form of droplets, in the manner which will be more fully described below.

The terminal portion 4 of the duct 3 is normally formed of a material, such as glass, which enables the terminal portion 4 itself to be given a certain rigidity.

An electro-acoustic transducer 7 of annular form surrounds the terminal portion 4 of the duct 3 and is fixed to the glass wall of this portion so as to transmit mechanical forces to the wall itself. In the example described, the transducer 7 is constituted by a radially-polarised piezoelectric ceramic element. The transducer 7, which is of a known type, has excitation electrodes (not illustrated) through which the transducer 7 can be given an electric excitation pulse, for example, a cosine square pulse.

As a result of the application of this pulse, the transducer 7 contracts so that its internal diameter is reduced. This reduction of the diameter of the transducer 7 corresponds to the transmission of a compression wave to the wall of the terminal portion 4 of the duct 3.

When the transducer 7 is excited, two pressure waves are generated within the ink in the terminal portion 4 of the duct 3, which are directed in opposite directions.

A first pressure wave is propagated towards the nozzle 5, causing the discharge of a droplet of ink through the orifice 6.

A second pressure wave, however, is propagated towards the portion of the duct 3 between the reservoir 1 and the terminal portion 4. This intermediate portion is generally indicated 8.

During its propagation in the duct 3, this second pressure wave (reverse wave) is subjected to reflection due to the surface discontinuities of the inner wall of the duct 3. Discontinuities of this type are present in the region between the terminal portion 4 and the intermediate portion 8 of the duct 3, since the intermediate portion 8, which acts as a portion for supplying ink to the terminal portion, is normally formed of a material (for example, a flexible material) different from that used for forming the terminal portion. Even more considerable reflections occur in the region between the duct 3 and the ink reservoir 1.

As a result of these reflections, the reverse wave "bounces back" towards the terminal portion 4 and the nozzle 5. This rebound may result in the undesirable discharge of a droplet of ink from the orifice 6. Even when this does not occur, the reverse wave reflected towards the nozzle interferes with the discharge of a new droplet of ink from the orifice 6 when this discharge is effected by excitation of the transducer 7. This interference has a harmful influence on the speed characteristics of the printer.

In the device according to the invention, this phenomenon is eliminated by achieving a substantial absorption of the energy of the reverse wave in the intermediate portion 8 of the duct 3, and by making the acoustic impedance of the intermediate portion 8 as to match the acoustic impedance of the terminal portion 4 so as to eliminate the reflections which occur in the region between these two portions.

In FIGS. 1 and 2, a tube of resilient material, such as polyvinyl chloride (PVC), indicated 9, is fitted at one end to the end of the terminal portion 4 of the duct 3 opposite the nozzle 5. At its opposite end the tube 9 is connected directly to the ink reservoir 1.

The material of the tube 9 and its dimension (length, internal diameter and wall thickness) are selected so that the acoustic impedance of the duct defined by the tube 9 matches the acoustic impedance of the terminal portion 4 of the duct 3. As described above, this allows the elimination of the reflections which occur in the region between the two portions of the duct 3.

The choice of the resilient material constituting the tube 9 and its dimensions may easily be carried out by taking into account the fact that the acoustic impedance $Z_\infty$ of the duct defined by this tube can be expressed by means of an equation of the type $$Z_\infty = \frac{\rho\, C_o}{\pi\, a^2} \cdot \frac{1}{\sqrt{1 + 2\left(\frac{b^2 + a^2}{b^2 - a^2} + \mu\right) \cdot \frac{E_1}{E_2}}}$$

where $\rho$ is the density of the liquid (ink) within the duct, $C_0$ is the speed of sound in this liquid, a is the radius of the internal cavity of the duct, b is the outer radius of the duct, $\mu$ is the Poisson modulus, and $E_1$ and $E_2$ are the elastic modulus of the liquid in the duct and the elastic modulus of the material forming the wall of the duct, respectively. A further refinement of the degree of matching of the acoustic impedance of the two portions 4, 8 of the duct 3 may be achieved experimentally.

A sleeve 10 of rigid or resilient material is fitted onto the tube 9 so as to define an annular chamber around the tube 9 closed at its ends by two end caps, one 11 of which is rigid with the reservoir 1 and the other 12 of which is fixed to a support S intended to support the terminal portion 4 of the ink duct 3 in its position of use.

The sleeve 10 and the annular caps 11 and 12 thus define a container the inner wall of which is constituted by the resiliently deformable wall of the tube 9.

This container therefore has one wall which is in contact with the ink in the intermediate portion of the duct 3 and deform resiliently under the action of the reverse pressure wave generated when the transducer 7 is excited to cause the discharge of a droplet of ink through the orifice 6 of the nozzle 5.

Normally, the tube 9 has a diameter slightly less than 1 mm and the diameter of the sleeve 10 is selected so that the annular chamber between this sleeve and the tube 9 has a radial width of about 1/10th mm.

This annular chamber is filled with a viscous fluid 13, such as viscostatic oil or a silicone oil. Depending on the droplet size, a satisfactory viscous effect may also be achieved by using a gaseous viscous fluid.

The arrangement described is such that the resilient energy of the reverse pressure wave is propagated through the ink in the tube 9 and is transmitted by the resiliently deformable wall of the tube 9 to the viscous fluid 13. This elastic energy is then dissipated as a result of the displacements of the viscous fluid caused by the deformation of the resilient wall of the tube 9.

This results in a considerable absorption of the reverse wave and the elimination of its harmful effect on the discharge of the ink droplets through the nozzle 5.

It should be noted that the damping means described achieve an absorbing action both on the reverse wave which is propagated towards the reservoir 1 in the intermediate portion 8 of the duct 3 and on the fraction of this wave which rebounds towards the terminal portion 4 of the duct 3 as a result of reflections of this wave in the region between the duct 3 and the reservoir 1.

After the resilient material constituting the tube 9 and the dimensions of the tube 9 itself have been selected so as to obtain an acoustic impedance of the intermediate portion 8 of the duct 3 adapted to the acoustic impedance of the terminal portion 4 of the duct, it is then possible to select the characteristics of the viscosity of the fluid constituting the filling 13 so as to obtain a high level of damping of the reverse wave, even in printers in which the intermediate portion 8 of the duct 3 has a small length. This allows the overall dimensions of the printer to be reduced considerably.

It should also be noted that, as described above, the sleeve 10 may also be made of resilient material. In order to make the acoustic impedance of the intermediate portion 8 of the duct 3 matching the acoustic impedance of the terminal portion 4 of the duct 3, it is thus also possible to change the elasticity and dimensions of the sleeve 10.

In the variant illustrated in FIG. 2, the damping characteristics of the viscous fluid 13 are improved by providing a tubular element 14 of rigid or semi-rigid material in the cavity between the sleeve 10 and the tube 9, it being supported at its ends by the annular caps 11 and 12.

The tubular element 14 constitutes a partition which divides the annular chamber filled with the viscous fluid 13 into two coaxial sections.

Holes 15 are provided in the wall of the tubular element 14 through which the viscous fluid 13 may be drawn from one section of the annular chamber to the other.

Typically, the tubular element 14 is constituted by a stainless steel tube having a thickness of about $\frac{1}{4}$ mm.

The holes 15, which are preferably made by means of a laser, have a diameter of about 0.1 mm and are arranged in the wall of the element 14 at a density of about 10 holes per centimeter of the axial length of the tubular element 14 itself. The dimensions of the sleeve 10 and the tubular element 14 are normally chosen so that the annular sections of the chamber containing the viscous fluid 13 each have a radial width of about $\frac{1}{8}$ mm.

Naturally, the principle of the invention remaining the same, the constructional details and the embodiments may be varied widely with respect to that described and illustrated, without thereby departing from the scope of the present invention.

I claim:

1. An ink jet printer comprising an ink reservoir, a tubular ink duct including a terminal portion made of a substantially rigid material and provided with an ink projecting nozzle at one end thereof, and an intermediate portion connected at one end to said reservoir and at the other end to said other end of the terminal portion, said intermediate portion being made of a substantially viscoelastic material, and a tubular transducer surrounding at least a part of the terminal portion of the duct for generating a first pressure wave in the ink, said first pressure wave being directed towards the nozzle to cause a droplet of ink to be discharged through the nozzle, while a second pressure wave associated with said first pressure wave is directed toward said intermediate portion of the duct, the acoustic impedance of said terminal portion matching that of said intermediate portion, whereby the second pressure wave is prevented from reflecting toward said terminal portion, wherein the improvement includes an elongated tubular container surrounding at least part of said intermediate portion of the duct and being sealed at the two ends with said intermediate portion to form an annular chamber closed at the two ends, and a viscous fluid filling said chamber, whereby said intermediate portion can deform resiliently under the action of said second pressure wave and transmit said pressure wave to said fluid, thus causing said intermediate portion to absorb the energy of said second pressure wave in a reduced length thereof before its connection with said reservoir.

2. A printer as defined in claim 1, wherein said container is partitioned internally so as to define a plurality of chambers, and wherein the partitioning defines holes for the passage of said viscous fluid.

3. A printer as defined in claim 1, wherein it further includes a tubular element of a material chosen from a rigid material and a semi-rigid material, said tubular element extending into the annular space between said part of the intermediate portion of the duct and said annular casing, and wherein said tubular element has a wall defining holes for the passage of said viscous fluid.

4. A printer as defined in claim 1, wherein said elongate container extends substantially over the whole length of said duct between the ink reservoir and said terminal portion.

5. A method of damping pressure waves in an ink-jet printer of the type comprising:

an ink reservoir;

an ink duct communicating with the reservoir and having a terminal portion and an intermediate portion between the reservoir and the terminal portion;

an ink projecting nozzle provided on said terminal portion of the duct;

transducer means associated with the terminal portion of the duct for generating a first pressure wave in the ink, which is directed towards the nozzle and causes a droplet of ink to be discharged through the nozzle, while a second pressure wave associated with the first pressure wave is directed towards the intermediate portion of the duct, wherein said method comprises the steps of:

providing adjacent at least part of said intermediate portion of the duct an elongate container having at least one wall which can deform resiliently under the action of the said pressure wave, and filling the container with a viscous fluid whereby the energy of said second pressure wave is substantially dissipated within the viscous fluid.

6. A method of damping pressure waves in an ink jet printer of the type comprising a tubular ink duct including a terminal portion of rigid material provided with an ink projecting nozzle and surrounded by a cylindrical transducer for generating a first pressure wave of the ink, which is directed toward the nozzle and causes a droplet of ink to be discharged through said nozzle, and including an intermediate portion between the terminal portion and an ink reservoir, a second pressure wave associated with the first pressure wave being directed toward the intermediate portion of the duct, said method comprising the steps of:

making said intermediate portion of a substantially viscostatic material, making the acoustic impedance of said intermediate portion matching the acoustic impedance of said terminal portion, surrounding at least part of said intermediate portion of the duct with an elongate container forming with said intermediate portion a closed annular chamber which can deform resiliently under the action of the said pressure wave, and filling the container with a viscous fluid, whereby the energy of said second pressure wave is transmitted from said intermediate portion to said fluid and is fully dissipated within the viscous fluid.

* * * * *

UNITED STATES PATENT AND TRADEMARK OFFICE
CERTIFICATE OF CORRECTION

PATENT NO. : 4,528,579

DATED : July 9, 1985

INVENTOR(S) : RICCARDO BRESCIA

It is certified that error appears in the above-identified patent and that said Letters Patent is hereby corrected as shown below:

Cancel Claim 5

Claim 6, line 46, delete "viscostatic" and insert —viscoelastic—; line 54, before "pressure", insert —second—.

Signed and Sealed this

*Sixteenth* Day of *September 1986*

[SEAL]

*Attest:*

DONALD J. QUIGG

*Attesting Officer* *Commissioner of Patents and Trademarks*